No. 646,305. Patented Mar. 27, 1900.
A. P. MORROW.
CLUTCH MECHANISM.
(Application filed Sept. 19, 1899.)
(No Model.) 2 Sheets—Sheet 1.
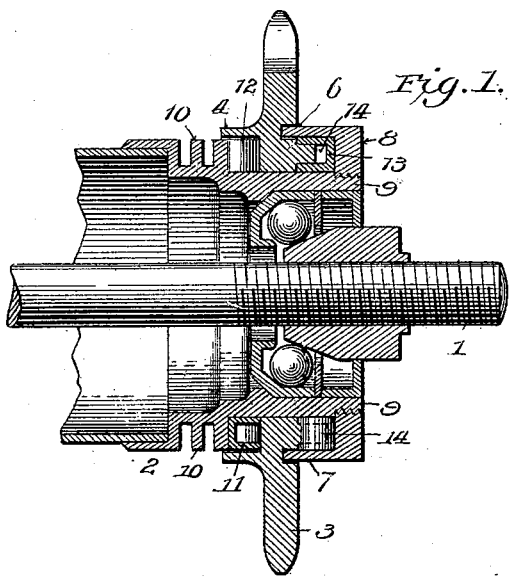
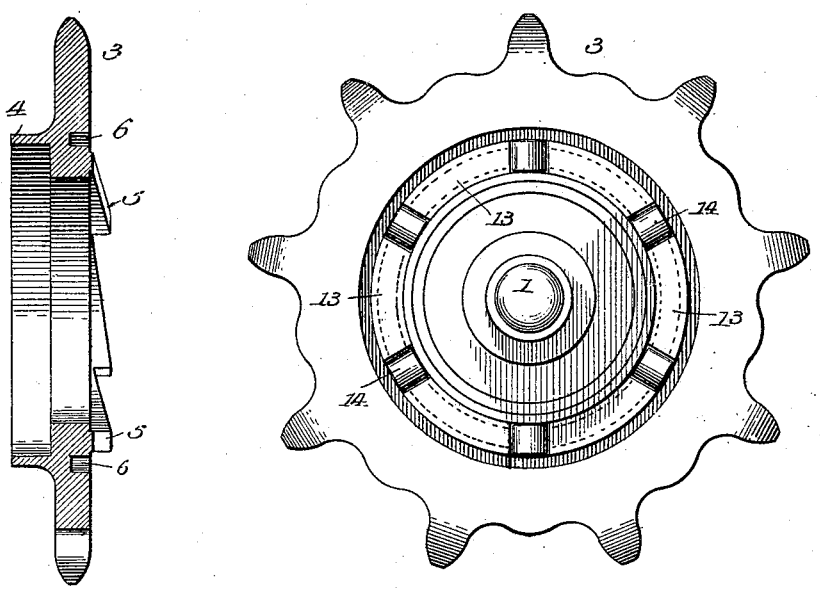
Witnesses
Harry S. Rohrer
May M. Plyer
Inventor
Alexander P. Morrow
by Jas. L. Skidmore
his Attorney.

No. 646,305. Patented Mar. 27, 1900.
A. P. MORROW.
CLUTCH MECHANISM.
(Application filed Sept. 19, 1899.)
(No Model.) 2 Sheets—Sheet 2.
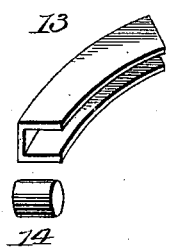
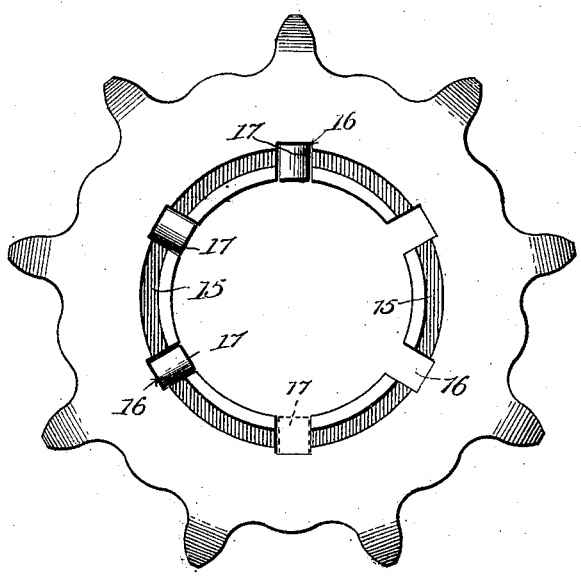
Witnesses
Harry S. Rohrer
Mary M. Pliger
Inventor
Alexander P. Morrow
by Jas. L. Skidmore
his Attorney.

UNITED STATES PATENT OFFICE.

ALEXANDER PATTERSON MORROW, OF ELMIRA, NEW YORK.

CLUTCH MECHANISM.

SPECIFICATION forming part of Letters Patent No. 646,305, dated March 27, 1900.

Application filed September 19, 1899. Serial No. 730,987. (No model.)

*To all whom it may concern:*

Be it known that I, ALEXANDER PATTERSON MORROW, a citizen of the United States, residing at Elmira, in the county of Chemung and State of New York, have invented certain new and useful Improvements in Clutch Mechanism for Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to clutch mechanism for bicycles; and its object is to provide improved clutch mechanism whereby the driving sprocket-wheel on the rear hub of a bicycle may be firmly locked to the hub to revolve therewith and automatically unlocked to permit the rider to coast when the revolution of the sprocket-wheel is stopped.

The construction of the improvement will be fully described hereinafter and its characteristic features defined in the appended claims in connection with the accompanying drawings, in which—

Figure 1 is a longitudinal section of a portion of a wheel-hub with my improvements applied thereto. Fig. 2 is a detail sectional view of the sprocket-wheel employed with the clutch mechanism. Fig. 3 is a side elevation of the outer side of the sprocket with the clutch devices in place thereon. Fig. 4 is a detail perspective view showing one of the segmental boxes or guides and one of the rollers. Fig. 5 is a perspective view of the flanged retaining-ring for supporting the sprocket upon the hub. Fig. 6 is a side elevation of a modified construction of sprocket-wheel. Fig. 7 is a detail sectional view of a modified construction of hub with which the sprocket-wheel shown in Fig. 6 is employed. Fig. 8 is a sectional elevation of the brake-ring shown in Fig. 7.

The reference-numeral 1 designates the rear axle of a bicycle, and 2 the hub mounted thereon and equipped with any approved form of ball-bearings.

3 designates the sprocket-wheel, formed on its inner side with an annular horizontally-projecting flange 4 and on its outer side with a series of inclined teeth 5 and an annular groove or recess 6 to receive an annular flange 7, projecting horizontally from the inner side of a retaining-ring 8, which is internally threaded to fit upon the externally-threaded end 9 of the hub.

The hub is formed with spoke-flanges 10. The flange 4 of the sprocket extends over the outer spoke-flange 10, and between the latter and the inner side of the sprocket are interposed a plurality of segmental boxes or guides 11, which are open at their outer sides. I preferably employ only two of the segmental boxes 11 on the inner side of the sprocket, separated by rollers 12, which rest between the ends of the boxes.

Within the space between the retaining-ring 8 and the outer toothed side of the sprocket I provide a plurality of segmental boxes 13, open at their inner sides and separated by rollers 14, placed between the ends of the boxes.

The operation of the mechanism thus constructed is as follows: The teeth 5 on the outer side of the sprocket project within the boxes 13, and when the sprocket is driven forward by the usual chain said teeth ride up over the rollers 14, thus forcing the sprocket inward and causing the boxes 11 and rollers 12 on the inner side of the sprocket to bind against the outer spoke-flange 10 with sufficient force to lock the sprocket thereto and cause it to revolve with the hub. As soon as the forward driving is stopped the teeth 5 recede from the rollers 14 and drop behind them into the boxes 13, thus releasing the sprocket and permitting the hub to revolve, while the sprocket and pedals remain stationary.

In the modification shown in Figs. 6 and 7 the boxes 11 and 13 and the rollers 12 are omitted, and the inner side of the sprocket is formed with segmental grooves or guideways 15 and a series of radial recesses 16, within which are located rollers 17, one of said rollers 17 being shown by dotted lines in Fig. 6. With this form of sprocket I employ a hub formed with an annular boss or rib 18, having a beveled periphery 19 and a laterally-movable ring 20, provided with a horizontal annular flange 21, beveled on its inner surface to coact with the beveled rib 18. The sprocket is supported upon the hub by an internally-threaded retaining-ring 22, fitting upon the hub. The outer face of the ring 20 is formed with teeth 23, similar to the teeth 5 on the sprocket shown in Figs. 1 and 3, and the operation of the device is substantially as above described, the forward motion of the sprocket causing the teeth of the ring 20 to ride up upon the rollers to force the ring against the rib 18, while a stoppage of the sprocket for coasting causes the teeth 22 to drop away from the rollers and into the groove 15 of the sprocket-wheel, thus permitting a free revolution of the hub, while the sprocket remains stationary.

I claim—

1. Clutch mechanism for bicycles, comprising an annular friction-surface on the hub, and loosely-mounted sprocket-wheel; segmental guideways; rollers separating said guideways; inclined teeth coöperating with said rollers; laterally-movable means for frictionally engaging said annular friction-surface and locking the sprocket to the hub, and means for resisting the lateral thrust of the sprocket.

2. Clutch mechanism for bicycles comprising an annular friction-surface on the hub; a sprocket-wheel provided on one side with means for engaging said friction-surface, and on its opposite side with inclined teeth; a plurality of segmental boxes or guideways into which said teeth are adapted to project, a plurality of rollers interposed between the ends of said boxes or guides, and a retaining-ring.

3. Clutch mechanism for bicycles, comprising an annular friction-surface on the hub; a sprocket-wheel formed on its outer side with inclined teeth; means interposed between the friction-surface and sprocket for locking the latter to the hub; a retaining-ring; a plurality of segmental boxes or guides open at one side, between the sprocket and retaining-ring, and a plurality of rollers separating said boxes or guides.

4. Clutch mechanism for bicycles comprising an annular friction-surface on the hub; a sprocket-wheel formed on its outer side with inclined teeth and an annular groove; means between the friction-surface and sprocket for locking the latter to the hub; a retaining-ring provided with an annular flange projecting into said groove; segmental boxes or guides open at one side between the sprocket and retaining-ring; and rollers loosely supported between the ends of said boxes or guides.

5. The combination with a bicycle-hub provided with an annular friction rib or flange; of a sprocket-wheel provided on its inner side with an annular flange, and on its outer side with inclined teeth and an annular groove; means located between the friction rib or flange and the sprocket for locking the latter, to the hub; a flanged retaining-ring, and segmental boxes or guides between the sprocket and retaining-ring separated by interposed rollers.

In testimony whereof I affix my signature in presence of two witnesses.

ALEXANDER PATTERSON MORROW.

Witnesses:
F. G. WISHARD,
RALPH W. WEBSTER.